July 3, 1928.
H. B. BROWN
THERMOMETER
Filed March 3, 1927
1,675,531
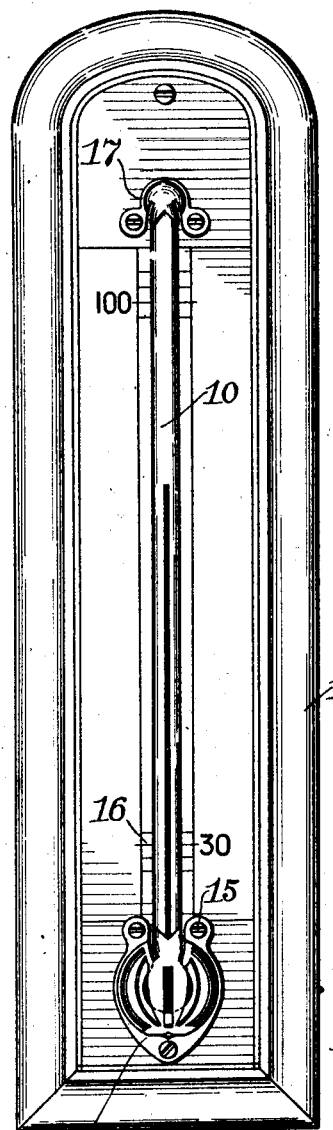
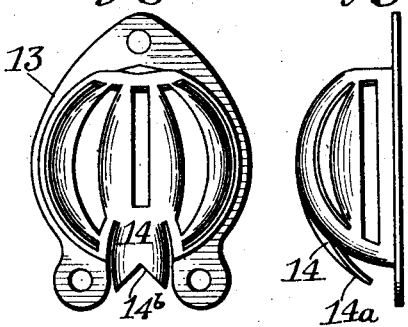
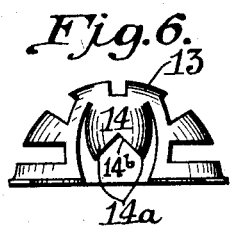
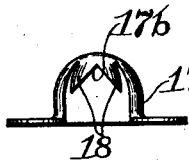
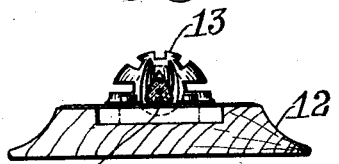
INVENTOR:
Henry B. Brown
BY Alfred Barger,
his ATTORNEY Patented July 3, 1928.

1,675,531

UNITED STATES PATENT OFFICE.

HENRY B. BROWN, OF ROCHESTER, NEW YORK, ASSIGNOR TO TAYLOR INSTRUMENT COMPANIES, OF ROCHESTER, NEW YORK, A CORPORATION OF NEW YORK.

THERMOMETER.

Application filed March 3, 1927. Serial No. 172,480.

This invention relates to thermometers or like indicating instruments having a glass stem and a bulb mounted on a supporting base.

Heretofore it was the practice to hold the thermometer stem or tube to the base by means of straps and screws and to protect the bulb by means of guard likewise attached to the base by means of screws or the like.

It is the general object of the invention to provide a guard construction which has the dual function of protecting the bulb and holding the stem to the base.

Another and more particular object is the provision of a guard of the character referred to which may be applied to a wide range of different stems and bulbs, thus simplifying and standardizing the manufacture.

For a full understanding of the invention, reference is made to the accompanying drawings wherein:

Fig. 1 is an elevation of a device embodying the invention;

Fig. 2 is a side elevation thereof;

Fig. 3 is a horizontal section showing the principal part in end view;

Figs. 4-5-6 are a plan view, a side view and end view, on an enlarged scale of a detail shown in Figs. 1-3;

Figs. 7-8-9 are a plan view, a side view and an end view, on an enlarged scale of another detail shown in Figs. 1-3;

Having reference to Figs. 1-3 showing a thermometer of usual construction, 10 is the stem terminating in the bulb 11 and 13 is the base or support.

The bulb 11 is protected by a guard 13 which may have any desired form, but which in general is a hood shaped member, as is usual, secured to the base. The characteristic feature of this hood is a resilient portion, preferably stamped out from the metal of the guard, so disposed as to bear upon the stem to hold it against the base. While also this resilient portion may have various forms, I preferably provide a relatively long tongue 14 the free end of which has a V-shaped notch 14$^b$ defining fingers 14$^a$. By this arrangement the fingers 14$^a$ do not only bear upon the stem to hold it against the base, but they also exert a centering action preventing lateral movement of the stem.

In practice, after adjusting the tongue 14 for tension, the guard 13 is secured on the base, as for instance by means of the three screws 15, so as to properly center the stem relatively to the scale 16. Thus the guard makes the use of separate straps unnecessary. Aside from the saving of an extra part and the time necessary to separately secure it in place, the arrangement disclosed obviates the necessity of drilling as many screw holes as before and in addition the appearance of the thermometer is materially enhanced.

The principle of the invention may be embodied also in a hood-shaped member 17 disposed at the opposite end of the stem. This member has a tongue 17$^a$ likewise provided with a V-shaped notch 17$^b$ defining fingers 18 adapted to straddle the stem to hold it against lateral movement and also to resiliently hold it to the base. The hood member 17 aside from its purely mechanical function of centering and holding the stem upon the base, has considerable ornamental value in its relation to and in conjunction with the guard at the lower end.

One distinct advantage of the form shown and described is the universality of application. The notch (14$^b$, 17$^b$) in the tongue is adapted for tubes of different sizes and the fitting requires merely a bending of the tongue to obtain the proper amount of resilient pressure.

While in practice I prefer resilient or elastic material, I am by no means limited to such material.

It is understood that the invention can be carried out in many ways and that the form disclosed is to be considered merely as an example for purposes of illustration.

I claim as my invention:

1. In instruments of the character described including a stem terminating in a bulb and a base therefor, a hood-shaped guard for the bulb having on one side an opening defining a passage for the stem and means forming an integral part of the hood-shaped portion for bearing upon the stem to hold it to its base.

2. In instruments of the character described including a stem terminating in a bulb and a base therefor, a guard secured to the base, having on one side an opening defining a passage for the stem, and a resilient tongue forming an integral part of the guard, said tongue being adjustable to exert any prescribed pressure upon a stem.

3. In instruments of the character described, including a stem terminating in a bulb and a base therefor, a guard secured to the base, having on one side an opening defining a passage for the stem, and a resilient tongue tending to reduce the size of the opening, the tongue being constructed and disposed to center the stem relatively to the guard and to resiliently press it against the support.

4. In instruments of the class described, including a stem and a base therefor, a hood shaped member secured to the base, enclosing one end of the stem, and spring means forming an integral part of the said member, disposed to resiliently bear upon the stem and constructed to maintain the latter against lateral movement.

5. In instruments of the class described, including a stem and a base therefor, a hood shaped member secured to the base, enclosing one end of the stem, and spring fingers forming integral parts of the said member, disposed to bear upon opposite sides of the stem to hold the latter to the base and against lateral movement.

6. In instruments of the character described, including a stem terminating in a bulb and a base therefor, a hood-shaped guard consisting of a single piece of sheet material and constructed to provide on one side an opening for the stem and a portion contiguous to the opening for bearing upon the stem to hold it to the base.

In testimony whereof I affix my signature.

HENRY B. BROWN.